United States Patent [19]

Okano

[11] 3,821,795

[45] June 28, 1974

[54] OPTICAL LOW-PASS FILTER

[75] Inventor: Yukio Okano, Minamikawachi-gun, Japan

[73] Assignee: Minolta Camera Kabushiki Kaisha, Osaka, Japan

[22] Filed: Oct. 2, 1972

[21] Appl. No.: 293,976

[30] Foreign Application Priority Data

Oct. 8, 1971 Japan ............................... 46-78729

[52] U.S. Cl. .......................... 358/47, 350/162 SF

[51] Int. Cl. ............................................ H04n 9/06

[58] Field of Search.......... 118/5.4 R, 5.4 E, 5.4 ST; 350/162 SF

[56] References Cited

UNITED STATES PATENTS

| | | | |
|---|---|---|---|
| 2,705,258 | 3/1955 | Lesti | 178/5.4 ST |
| 2,733,291 | 1/1956 | Kell | 178/5.4 ST |
| 3,566,013 | 2/1971 | Macovski | 178/5.4 ST |
| 3,588,224 | 6/1971 | Pritchard | 350/157 |
| 3,681,519 | 8/1972 | Larsen et al. | 178/5.4 ST |

*Primary Examiner*—Robert L. Richardson
*Attorney, Agent, or Firm*—Wolder & Gross

[57] ABSTRACT

An optical low-pass filter utilizing a phase grating is employed in a color television camera system. In order to eliminate the higher order spectra which produce flare or low contrast image, the strips of the phase grating are so shaped that their side surfaces are inclined to the base body or substrate. Such phase gratings, for example, are trapezoidal-wave, triangular-wave and sinusoidal-wave phase gratings. In the case of trapezoidal shaped laminae the following conditions apply:

$$1 - 0.65\ d/a_e \leqq \cos\delta \leqq 1 - 0.35\ d/a_e$$

$$d/a_e \geqq 2$$

where $a_e$ is the effective lamina width, $d$ is the spacing of the lamina and δ is maximum phase retardation introduced by the laminae.

8 Claims, 4 Drawing Figures

OPTICAL LOW-PASS FILTER

BACKGROUND OF THE INVENTION

The present invention relates to an improved optical apparatus which cuts off high spatial frequency components and, more particularly it relates to an improved optical low-pass filter in a single vidicon color television camera system.

In the single vidicon color television camera system, color signals are modulated by a color encoding stripe filter. If the object scene contains high spatial frequency components which fall into the chrominance signal band, spurious signals are produced by the interference between the luminance and chrominance signals. In order to eliminate the spurious signals, an optical low-pass filter which cuts off the high spatial frequency components is necessary for the suitable performance of a single vidicon color television camera. Since the high spatial frequency components effect the fine structure of images, the optical low-pass filter is an optical apparatus which produces blurred images. The amount of blur produced by the optical low-pass filter is defined by the pitch of the color encoding stripe filter. This fact demonstrates that the cutoff frequency of the optical low-pass filter depends upon the pitch of the stripe filter.

There is a requirement that the cutoff frequency of the optical low-pass filter be independent of the F-number of the television camera system. Several kinds of optical low-pass filters which satisfy this requirement are known.

It is known that a polygonal prism placed in the aperture of an optical system acts as an optical low-pass filter. HOwever, such a prism is difficult to manufacture and the setting plane of the prism is limited to the aperture of the optical system.

It is also known that a birefringent plate acts as an optical low-pass filter. However, when the incident light is plane polarized light, the birefringent plate cannot be used as an optical low-pass filter.

One of the optical low-pass filters used in the single vidicon color television camera system is a rectangular-wave phase grating. When a grating is placed in an optical system, the line spread function, defined as the intensity distribution in the image plane of a line source, becomes discrete spectra. Since the line spread function of a rectangular-wave phase grating extends discretely, blurred images are produced by using the grating. However, since the spectra of the grating extend infinitely, the higher order spectra become flare components and degrade the contrast of the images.

An object of the present invention is to provide a phase grating whose higher order spectra are of relatively low intensity.

DESCRIPTION OF THE INVENTION

Figure 1:
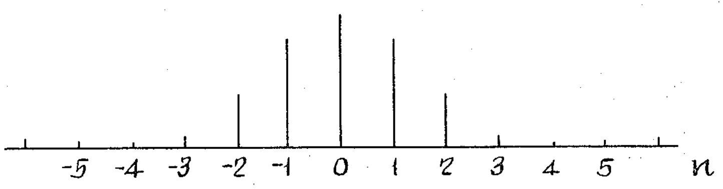
FIG. 1 illustrates a line spread function of a grating.

FIG. 1 shows a line spread function of a phase grating placed in an optical system. In FIG. 1, the order of the spectra is expressed as $n$. The position of $n$th order spectrum in the image plane is given by $$u = nb\lambda/d$$
$$(n = 0, \pm 1, \pm 2, \ldots..) \qquad (1)$$

where $u$ is the position in the image plane, $b$ is the distance between the grating and the image plane, $d$ is the grating spacing, and $\lambda$ is the wavelength of light. The intensity of each spectrum is a function of the grating shape. In the case of a rectangular-wave phase grating, the line spread function is given by the formula;

$$I_n = |\sin(n\pi)/n\pi - \sin(n\pi a/d)/n\pi + e^{i\,\delta} \sin(n\pi a/d)/n\pi|^2 \qquad (2)$$

where $a$ is the strip width and $\delta$ is the phase retardation of a rectangular-wave phase grating. The line spread function of a rectangular-wave phase grating varies with its grating parameters; $a$, $d$, $\delta$. The image of a line source extends discretely and infinitely, as shown in FIG. 1. The spectra which are effective to blur the image are defined by the pitch of the color encoding stripe filter as described above, so that the higher order spectra become flare components and degrade the contrast of the images. Therefore it is desirable to diminish the intensity of the higher order spectra.

The line spread function of a phase grating can be changed by varying the shape of lamina. According to the present invention the higher order spectra are diminished by modifying the shape of the rectangular-wave phase grating. The side faces of the lamina of the rectangular-wave phase grating is perpendicular to the base plate, while in the phase grating of the present invention the lamina side faces are inclined to the base plate.

Figure 2:
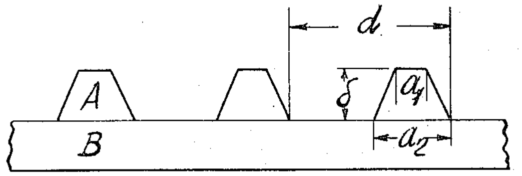
FIG. 2 shows the profile of a trapezoidal-wave phase grating which is one embodiment of the present invention.

FIG. 2 shows an embodiment of the present invention and is the cross section of a trapezoidal-wave phase grating. In FIG. 2, A designates the transparent strip whose transverse cross section are of trapezoidal shape and B is the transparent substrate base plate.

Let the effective strip width be $$a_e = (a_1 + a_2)/2 \ ;$$

and the inclination factor of the lamina side face be $$\eta = (a_1 + a_2)/2a_2$$

The line spread function of a trapezoidal-wave phase grating is expressed as $$I_n = |\sin(n\pi)/n\pi - \sin(2n\pi a_2/d)/n\pi + e^{i\,\delta} \cdot \sin(2n\pi a_1/d)/n\pi$$
$$+ 4n\pi[e^{i\,\delta} \sin(2n\pi a_1/d) - \sin(2n\pi a_2/d)]/[d\delta/(a_2 - a_1) - n\pi][d\delta/(a_2 - a_1) + n\pi]$$
$$+ 2i\delta d\,[\cos(2n\pi a_2/d) - e^{i\,\delta} \cos(2n\pi a_1/d)]/(a_2 - a_1)/[d\delta/(a_2 - a_1) - n\pi][d\delta/(a_2 - a_1) + a\pi]\ | \qquad (3)$$

where $\delta$ is maximum phase retardation. The line spread function of a trapezoidal-wave phase grating whose $\eta$ is 2/3 is compared with that of rectangular-wave phase grating. The conditions of comparison are as follows: phase retardation $\delta$ is $\pi$, the effective strip width $a_e$ is equal to the strip width of rectangular-wave phase grating, and the ratio of grating spacing $d$ to the effective strip width $a_e$ is 4:1.

Assume that the order of the spectra which is effective to blur the images is within ± fourth order. This region is defined by the pitch of the color encoding stripe filter. The light amount which falls into this region is 90.3 percent for the rectangular-wave phase grating and 95.9 percent for the trapezoidal-wave phase grating. These results are calculated according to Eqs. (2) and (3). The results demonstrate that the higher order spectra are greatly diminished by using a trapezoidal-wave phase grating. Therefore, the flare is diminished and the image possesses high contrast.

Figure 3:
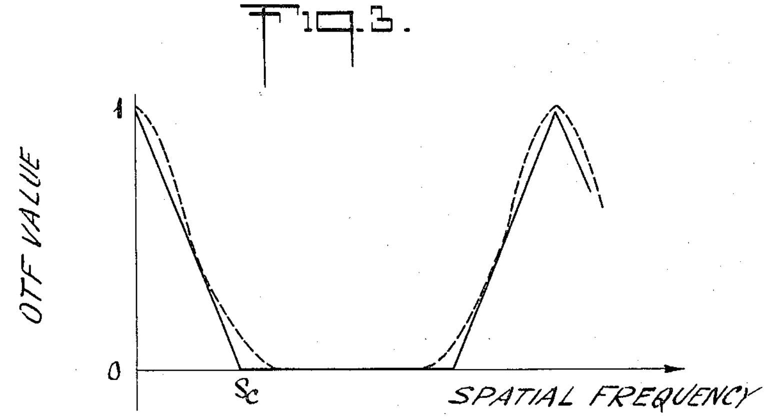
FIG. 3 illustrates the optical transfer functions of a rectangular-wave and a trapezoidal-wave phase grating.

FIG. 3 shows the optical transfer function (OTF) for the trapezoidal-wave phase grating in relation to that for rectangular-wave phase grating. In FIG. 3 the broken line is the optical transfer function for the trapezoidal-wave phase grating ($\eta = 2/3$, $\delta = \pi$, $a_e/d = 1/4$) and the solid line is that for the rectangular-wave phase grating ($\eta = 1$, $\delta = \pi$, $a/d = 1/4$). The optical transfer function for the trapezoidal-wave phase grating has a higher value in the low frequency region, so that the images possess higher contrast.

The cutoff frequency for a rectangular-wave phase grating is given by $$S_c = a/b\lambda$$

The optical transfer function for a trapezoidal-wave phase grating is rounded near the cutoff frequency $S_c$, as shown in FIG. 3. If the effective lamina width $a_e$ is equal to the lamina width a of the rectangular-wave phase grating, it can be considered that the cutoff frequency is unchanged by the use of a trapezoidal-wave phase grating.

It is necessary that the rectangular-wave phase grating which is used for single vidicon color television camera system satisfies the condition.

$$1 - 0.65\ d/a_e \leqq \cos\delta \leqq 1 - 0.35\ d/a_e$$

$$d/a_e \geqq 2$$

Since the optical transfer function for a trapezoidal-wave phase grating is similar to that for a rectangular-wave phase grating, the formula which is applicable to the rectangular-wave phase grating can be adopted to the trapezoidal-wave phase grating. If the strip width $a$ in inequality (4) is replaced by the effective strip width $a_e$, the above formulae are applicable.

Another embodiment of the present invention is a triangular-wave phase grating in which the laminae are of triangular transverse cross section. In this grating, the light amount which exists in the higher order spectra is smaller than the trapezoidal-wave phase grating. Therefore, the optical low-pass filter making use of triangular-wave phase grating is also useful for the single vidicon color television camera system and provides higher image contrast.

The trapezoidal-wave or triangular-wave phase grating can be made by vacuum evaporation on a transparent substrate or base plate. It is not necessary that the substrate or base plate is plane-parallel plate, because it is enough to produce the phase retardation by the strips. Therefore a lens which is one element of lens-system can be used as a substrate or base body. The trapezoidal-wave or triangular wave phase grating can be manufactured by placing the mask apart from the base plate.

Figure 4:
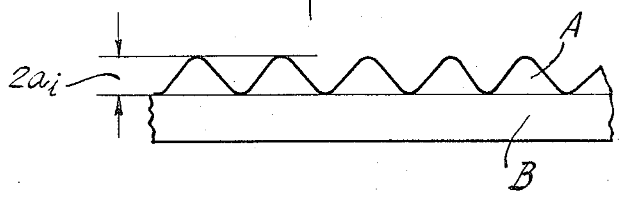
FIG. 4 is another embodiment of the present invention.

Another embodiment of the present invention is a sinusoidal-wave phase grating whose profile is shown in FIG. 4. The transverse cross section of the transparent laminae of this grating is a sinusoidal-wave. When a sinusoidal-wave phase grating is placed in an optical system, the line spread function becomes.

$$I_n = [J_n\ (2\pi a_i\ (n_i - 1)/\lambda)]^2$$

where $n_i$ is refractive index of lamina, $J_n$ indicates Bessel function of order $n$, and $2a_i$ is maximum height of the strip. By way of example in the case where $2\pi a_i\ (n_i - 1)/\lambda = 1.32$ the light amount which concentrates within ± fourth order spectra is almost 100 percent. Therefore the sinusoidal-wave phase grating has no flare components and is an ideal optical low-pass filter. The sinusoidal-wave phase grating is also obtained by vacuum evaporation and is made by vibrating the mask and/or the base plate.

In manufacture of the phase grating, if a master grating is initially produced the phase grating can be easily made by the duplication thereof.

In an optical low-pass filter making use of grating, the position of spectra is proportional to the distance between the grating and the image plane, so that the optical low-pass filter of the present invention has no restriction of the setting plane. If the optical low-pass filter is set at the rear of the lens system, the amount of blur is not affected by the focal length of the lens system or by the object distance.

While the embodiments of the present invention which have been specifically described above are one-dimensional optical low pass filters it is simple to produce two-dimensional low-pass filters which utilize the principals and concepts of the present invention.

While there have been described and illustrated preferred embodiments of the present invention, it is apparent that numerous alterations, omissions and additions may be made without departing from the spirit thereof.

I claim:

1. An optical low-pass filter in a color television camera system; said optical low-pass filter comprising transparent strips and a transparent base body, said transparent strips being disposed and regularly spaced on a face of said base body and having side faces which are inclined to the base body face and possessing the following parameters:

$$1 - 0.65\ d/a_e \leqq \cos\delta \leqq 1 - 0.35\ d/a_e/d/a_e \geqq 2$$

wherein $a_e$ is the effective strip width, $d$ is the spacing of strips and $\delta$ is the maximum phase retardation introduced by the strips.

2. An optical low-pass filter as set forth in claim 1 wherein the shapes of the transparent strips are trapezoidal.

3. An optical low-pass filter as set forth in claim 1 wherein the shapes of the transparent strips are triangular.

4. An optical low-pass filter as set forth in claim 1 wherein the shapes of the transparent strips are sinusoidal.

5. In combination with a single vidicon color television camera including an image forming optical system, an optical low pass filter extending across the light rays traversing said optical system and comprising a transparent substrate and regularly spaced transparent strips disposed on a face of said substrate and having side faces which are inclined to said substrate face, said filter having parameters satisfying the following conditions:

$$1 - 0.65\ d/a_e \leqq \cos\delta \leqq 1 - 0.35\ d/a_e\ /d/a_e \geqq 2$$

where $a_e$ is the effective strip width, $d$ is the spacing of the strips and $\delta$ is maximum phase retardation introduced by the strips.

6. The combination of claim 5 wherein said strips are of trapezoidal transverse cross section.

7. The combination of claim 5 wherein said strips are of triangular transverse cross section.

8. The combination of claim 5 wherein said strips are of sinusoidal transverse cross section of the following parameters:

$$2\ \pi ai(n - 1)/\lambda = 1.32$$

wherein $2ai$ is the maximum height of each strip, $ni$ is refractive index of the strip and $\lambda$ is the wavelength of the light.

* * * * *